United States Patent
Doege (10) Patent No.: US 9,374,219 B2
(45) Date of Patent: Jun. 21, 2016

(54) METHOD AND APPARATUS FOR SECURING ACCESS TO AN INTEGRATED CIRCUIT

(71) Applicant: Advanced Micro Devices, Inc., Sunnyvale, CA (US)

(72) Inventor: Jason Doege, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 29 days.

(21) Appl. No.: 14/551,170

(22) Filed: Nov. 24, 2014

(65) Prior Publication Data

US 2016/0149697 A1    May 26, 2016

(51) Int. Cl.
H04L 29/00 (2006.01)
H04L 9/06 (2006.01)

(52) U.S. Cl.
CPC ................................. H04L 9/0662 (2013.01)

(58) Field of Classification Search
CPC .................................................... H04L 9/0662
USPC ......................................................... 713/189
See application file for complete search history.

(56) References Cited

U.S. PATENT DOCUMENTS

| | | | | |
|---|---|---|---|---|
| 4,377,757 A * | 3/1983 | Konemann | ....... | G01R 31/31813 326/16 |
| 5,184,067 A * | 2/1993 | Nozuyama | ..... | G01R 31/318516 324/73.1 |
| 6,523,099 B1 * | 2/2003 | Namekawa | ............. | G06F 21/79 710/200 |
| 6,965,675 B1 * | 11/2005 | Trimberger | ............. | G06F 21/76 380/277 |
| 7,139,956 B2 * | 11/2006 | Nozuyama | ............. | G11C 29/56 714/726 |
| 7,900,064 B2 * | 3/2011 | Cruzado | ................. | G06F 21/85 713/194 |

OTHER PUBLICATIONS

Paolo MAISTRI/ Advanced Encryption Standard Secured Archetecture and its Auto-Test Capabilities/2016/pp. 1-36.*
W.Sanayha, Y.Rangsanseri/ Hardware Implementation of the Data Encryption Standard(DES)/2002/pp. 1-4.*
Ahto Buldas/ A VLSI implementation of RSA and ISEA encryption engine/2006/pp. 1-7.*
The Institute of Electrical and Electronics Engineers, Inc., IEEE Standard Testability Method for Embedded Core-based Integrated Circuits, IEEE Std 1500-2005(R2011), Aug. 29, 2005, 128 pgs., ISBN 0-7381-4693-5 SH95335, United States of America.

(Continued)

Primary Examiner — Jeffrey Pwu
Assistant Examiner — Michael D Anderson
(74) Attorney, Agent, or Firm — Volpe and Koenig, P.C.

(57) ABSTRACT

A method and apparatus are described securely testing an integrated circuit (IC). When the IC is powered on, a first bit stream including unencrypted data bits and encrypted data bits is received by the IC, a second bit stream is generated based on a pseudorandom pattern, a third bit stream is generated by convolving the first bit stream with the second bit stream, the third bit stream is fed to at least one selected test data register (TDR), (i.e., a shift register), in the IC, a fourth bit stream is generated by delaying the second bit stream, and a fifth bit stream is generated by convolving a sixth bit stream output by the at least one selected TDR with the fourth bit stream. The fifth bit stream includes the same unencrypted data bits and encrypted data bits as the first bit stream.

20 Claims, 7 Drawing Sheets

(56) References Cited

OTHER PUBLICATIONS

The Institute of Electrical and Electronics Engineers, Inc., IEEE Standard for Test Access Port and Boundary-Scan Architecture, IEEE Std 1149.1-2013 (Revision of IEEE Std 1149.1-2001), May 13, 2013, 444 pgs., ISBN 978-0-7381-8263-6 STD98160, United States of America.

The Institute of Electrical and Electronics Engineers, Inc., IEEE P1687/D1.70 Draft Standard for Access and Control of Instrumentation Embedded within a Semiconductor Device, Mar. 2014, 294 pgs., United States of America.

* cited by examiner

METHOD AND APPARATUS FOR SECURING ACCESS TO AN INTEGRATED CIRCUIT

FIELD OF INVENTION

The present invention is generally directed to a method and apparatus for securing access to an integrated circuit (IC), (i.e., a semiconductor device or chip), in order to prevent reverse engineering of the IC.

BACKGROUND

Joint Test Action Group (JTAG) is the common name for Institute of Electrical and Electronics Engineers (IEEE) 1149.1 standard test access port and boundary-scan architecture. JTAG was an industry group formed to develop a method for testing populated circuit boards after manufacture. JTAG was initially devised by electronic engineers for testing printed circuit boards using boundary scan and is still widely used for this application. Additionally, JTAG is used to control and observe on-chip instrumentation, program programmable logic, control test modes for manufacturing tests of the chip itself, and other similar purposes.

In many ICs today, all signal pins that connect to other devices on the board logic may be linked together in a set called a boundary scan chain. By using JTAG to manipulate the chip's external interface via inputs and outputs to other chips, it is possible to test for certain faults, caused mainly by manufacturing problems. By using JTAG to manipulate its internal interface (to on-chip registers), the IC or device logic may be tested.

In both cases (external and internal), this testing may be performed with the IC after it is mounted on the circuit card, and possibly while in a functioning system. When combined with scan, built-in self-test (BIST), and other test techniques, JTAG may enable a low overhead, embedded solution to testing an IC for certain static dynamic defects (shorts, opens, resistor and capacitor bridging and other defects). JTAG may also assist in diagnosing faults or testing for timing, temperature or other dynamic operational errors that may occur.

Figure 1:
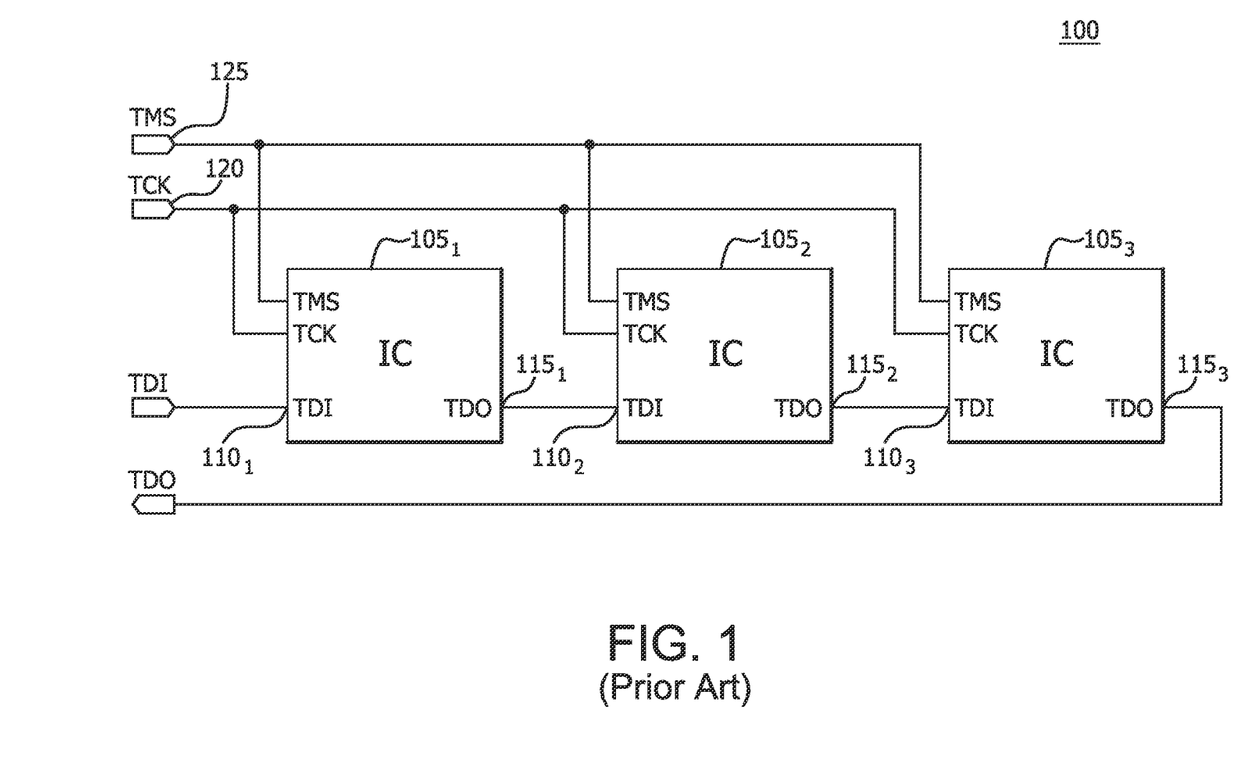
FIG. 1 shows a conventional Joint Test Action Group (JTAG) interface scheme.

A JTAG interface is a special interface that may be added to an IC. Multiple chips on a printed circuit board (PCB) may have their JTAG lines daisy-chained together if specific conditions are met. A test probe may only have to connect to a single "JTAG port" to have access to all ICs on the chips on the PCB. For example, FIG. 1 shows an example of a circuit having a plurality of daisy-chained ICs 1051, 1052 and 1053. Each IC 105 has a test data in (TDI) port 110 and a test data out (TDO) port 115. A test clock (TCK) signal 120 may be provided to each of the ICs 105, and a test mode may be selected based on a test mode select (TMS) signal 125 provided to each of the ICs 105.

A manufacturer of an IC may desire to remotely communicate with one or more of the ICs it manufactures over various interfaces to perform various tests and troubleshooting procedures when necessary. However, it would be desired to have a mechanism in place to prevent an unauthorized party from monitoring (i.e., hacking into) the tests and troubleshooting procedures, which may provide the unauthorized party with sufficient information to reverse engineer the manufacturer's products. Further, the manufacturer may desire to have an authorized third party perform these tests and troubleshooting procedures on its behalf, without being able to obtain intimate knowledge of the interworkings and proprietary features of large portions of circuitry in the IC that may be used to support reverse engineering efforts.

SUMMARY OF THE EMBODIMENTS

A method and apparatus are described securely testing an integrated circuit (IC). When the IC is powered on, a first bit stream including unencrypted data bits and encrypted data bits is received by the IC, a second bit stream is generated based on a pseudorandom pattern, a third bit stream is generated by convolving the first bit stream with the second bit stream, the third bit stream is fed to at least one selected test data register (TDR), (i.e., a shift register), in the IC, a fourth bit stream is generated by delaying the second bit stream, and a fifth bit stream is generated by convolving a sixth bit stream output by the at least one selected TDR with the fourth bit stream. The fifth bit stream includes the same unencrypted data bits and encrypted data bits as the first bit stream.

A first exclusive-or (XOR) gate in the IC is used to convolve the first bit stream with the second bit stream.

A second XOR gate in the IC is used to convolve the sixth bit stream output by the at least one selected TDR with the fourth bit stream.

The first XOR gate is configured to selectively invert the bits in the first bit stream based on the second bit stream.

The second XOR gate is configured to selectively invert the bits in the sixth bit stream output by the at least one selected TDR based on the fourth bit stream.

The fourth bit stream is generated based on a selected polynomial and a selected seed. The length of the at least one selected TDR may be adjusted.

The at least one selected TDR is selected from a plurality of concatenated TDRs. The first bit stream consists of logic 1 bits and logic 0 bits.

Bits in the first bit stream that are destined to be updated in the at least one selected TDR are encrypted, and all other bits in the first bit stream are unencrypted.

Bits in the first bit stream that are captured by the at least one selected TDR are unencrypted.

In another embodiment, a semiconductor device may comprise an input configured to receive a first bit stream including unencrypted data bits and encrypted data bits, a pseudorandom pattern generator (PRPG) configured to generate a second bit stream, a first exclusive-or (XOR) gate configured to generate a third bit stream by convolving the first bit stream with the second bit stream, a test data register (TDR) unit configured to receive the third bit stream, a delay unit configured to generate a fourth data stream by delaying the second bit stream, and a second XOR gate configured to generate a fifth bit stream by convolving a sixth bit stream output by the at least one selected TDR with the fourth bit stream. The fifth bit stream includes the same unencrypted data bits and encrypted data bits as the first bit stream.

The first XOR gate is coupled to the PRPG, the delay unit and an input to the TDR unit. The second XOR gate is coupled to the delay unit and an output from the TDR unit. The second bit stream is generated by the PRPG based on a selected characteristic sequence and a selected seed. The length of the TDR unit is adjustable. The first bit stream consists of logic 1 bits and logic 0 bits.

The first XOR gate is configured to selectively invert the bits in the first bit stream based on the second bit stream.

The second XOR gate is configured to selectively invert the bits in the sixth bit stream based on the second bit stream. Bits in the first bit stream that are destined to be updated in the at least one selected TDR are encrypted, and all other bits in the first bit stream are unencrypted. Bits in the first bit stream that are captured by the at least one selected TDR are unencrypted.

In another embodiment, a non-transitory computer-readable storage medium may be configured to store a set of instructions used for manufacturing a semiconductor device. The semiconductor device comprises an input configured to receive a first bit stream including unencrypted data bits and encrypted data bits, a pseudorandom pattern generator (PRPG) configured to generate a second bit stream, a first exclusive-or (XOR) gate configured to generate a third bit stream by convolving the first bit stream with the second bit stream, a test data register (TDR) unit configured to receive the third bit stream, a delay unit configured to generate a fourth data stream by delaying the second bit stream, and second XOR gate configured to generate a fifth bit stream by convolving a sixth bit stream output by the at least one selected TDR with the fourth bit stream, wherein the fifth bit stream includes the same unencrypted data bits and encrypted data bits as the first bit stream. The instructions may be Verilog data instructions and/or hardware description language (HDL) instructions.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Embodiments are described for securing an IC from being reversed engineered based on data, (e.g., serial data), being sent to the IC and sent from the IC, preferably at the same time. An encryption and decryption scheme may be implemented whereby the schemes operate simultaneously and are inverse functions of each other. Further, the encryption scheme is made aware of the past activities (i.e., the history) of the decryption scheme and responds appropriately.

Figure 2:
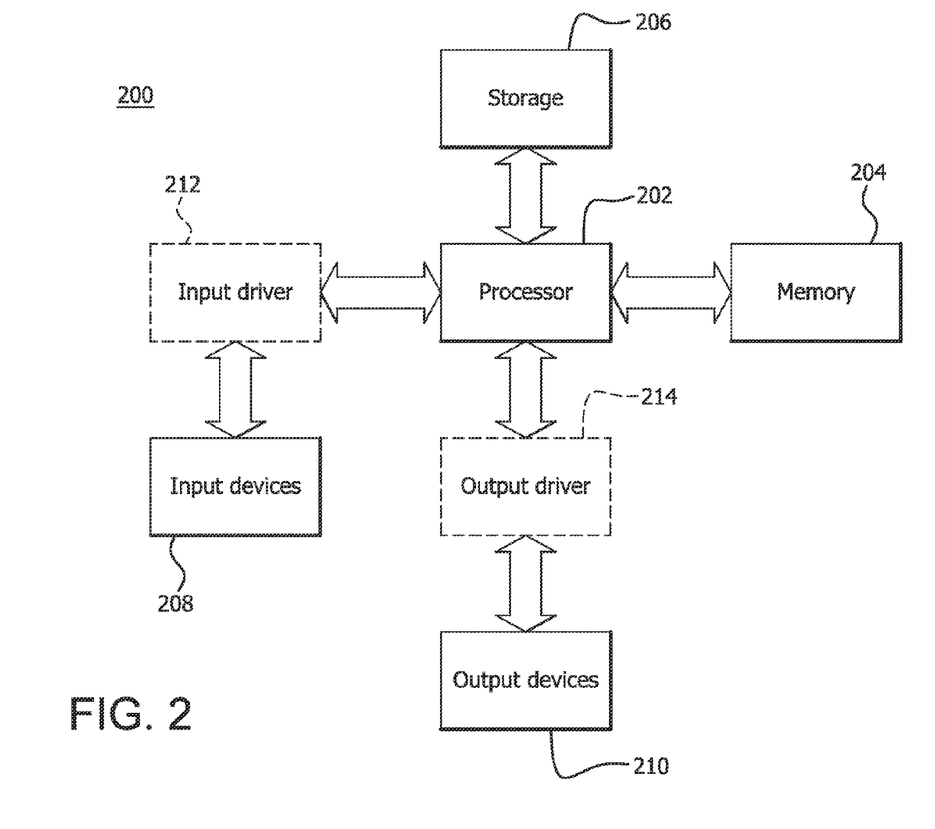
FIG. 2 is a block diagram of an example device in which one or more disclosed embodiments may be implemented.

FIG. 2 is a block diagram of an example device 200 in which one or more disclosed embodiments may be implemented. The device 200 may include, for example, a computer, a gaming device, a handheld device, a set-top box, a television, a mobile phone, a tablet computer, or any other device. The device 200 includes a processor 202, a memory 204, a storage 206, one or more input devices 208, and one or more output devices 210. The device 200 may also optionally include an input driver 212 and an output driver 214. It is understood that the device 200 may include additional components not shown in FIG. 2.

The processor 202 may include a central processing unit (CPU), a graphics processing unit (GPU), a CPU and GPU located on the same die, or one or more processor cores, wherein each processor core may be a CPU, a GPU or any other device. The memory 204 may be located on the same die as the processor 202, or may be located separately from the processor 202. The memory 204 may be a memory subsystem including at least a volatile or non-volatile memory, for example, random access memory (RAM), dynamic RAM, or a cache.

The storage 206 may include a fixed or removable storage, for example, a hard disk drive, a solid state drive, an optical disk, or a flash drive. The input devices 208 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 210 may include a display, a speaker, a printer, a haptic feedback device, one or more lights, an antenna, or a network connection (e.g., a wireless local area network card for transmission and/or reception of wireless IEEE 802 signals).

The input driver 212 communicates with the processor 202 and the input devices 208, and permits the processor 202 to receive input from the input devices 208. The output driver 214 communicates with the processor 202 and the output devices 210, and permits the processor 202 to send output to the output devices 210. It is noted that the input driver 212 and the output driver 214 are optional components, and that the device 200 will operate in the same manner if the input driver 212 and the output driver 214 are not present.

Figure 3A:
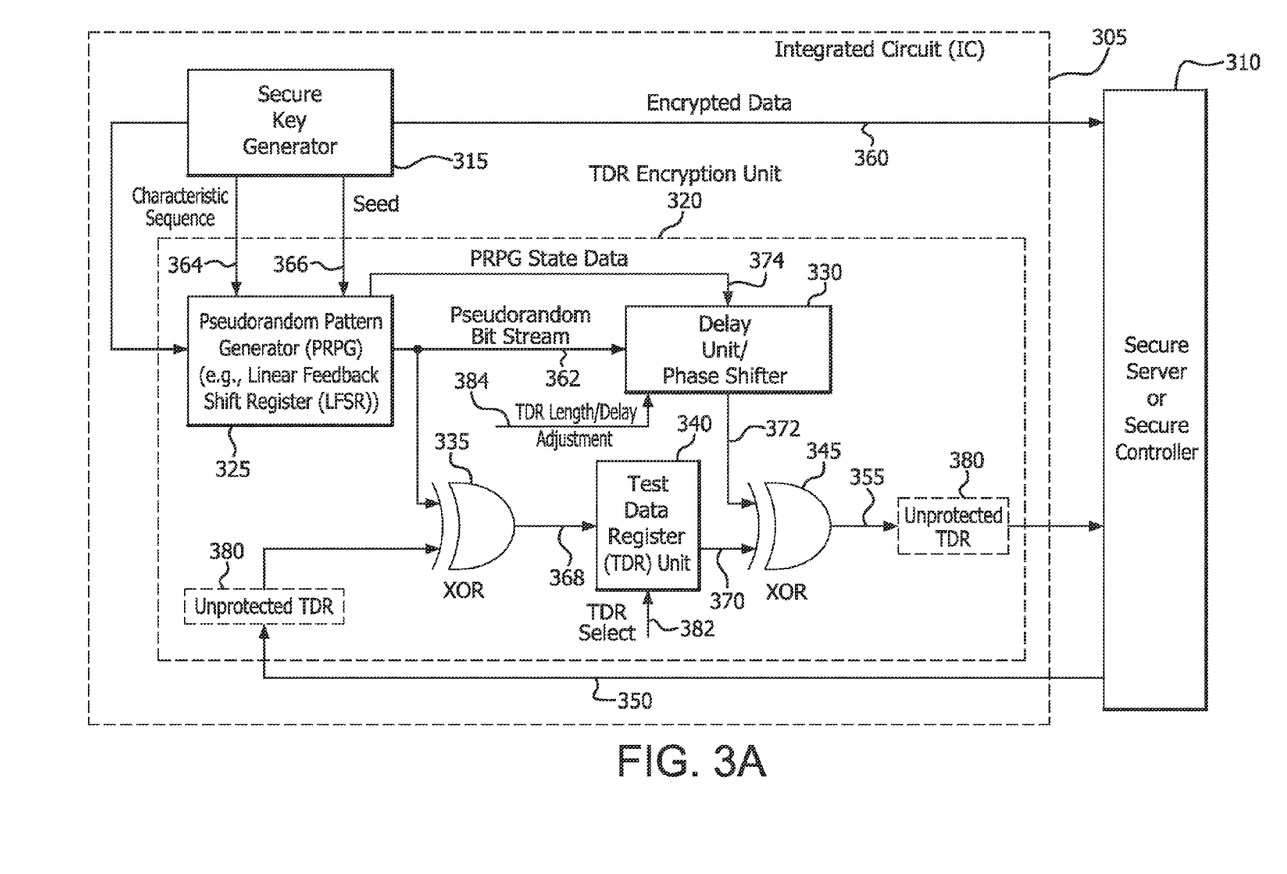
FIG. 3A shows an integrated circuit (IC) communicating with a secure server or secure controller.

FIG. 3A shows an IC 305, (e.g., a semiconductor device, a chip, or a processor such as processor 202), communicating with another device, such as a secure server or secure controller 310. In one embodiment of the invention, it is desired to prevent an unauthorized party from monitoring (i.e., hacking into) tests and troubleshooting procedures performed on the IC 305 by the secure server or secure controller 310, which may provide the unauthorized party with sufficient information to reverse engineer the manufacturer's products. The IC 305 may include a secure key generator 315 and a test data register (TDR) encryption unit 320. The TDR encryption unit 320 may include a pseudorandom pattern generator (PRPG) 325, a delay unit 330, a first exclusive or (XOR) gate 335, a TDR unit 340, and a second XOR gate 345. The PRPG 325 may be a linear feedback shift register (LFSR).

Since it is desired to prevent the characteristics of the IC 305 from being accessed by an unauthorized party, the inputs and outputs of the IC 305 and the secure server or secure controller 310 include encrypted data. For example, as shown in FIG. 3A, the secure server or secure controller 310 may be configured to send a bit stream 350 to the TDR encryption unit 320 of the IC 305, receive a bit stream 355 from the TDR encryption unit 320 of the IC 305, and receive encrypted data 360 from the secure key generator 315 of the IC 305.

The bit stream 350 is a serial bit stream operating at a particular known rate that includes unencrypted (i.e., clear) data bits and encrypted data bits. The bit stream 350 may consist of a series of logic 1 bits and logic 0 bits, which may be provided to a first input of the first XOR gate 335. The bits may be synchronized to a clock (not shown).

The PRPG 325 is configured to generate a pseudo random bit stream 362 including a predictable sequence of logic "1" bits and logic "0" bits as a function of a characteristic sequence 364, (e.g., a polynomial), and a seed 366 received from the secure key generator 315. The characteristic sequence 364 indicates the characteristic function of the PRPG 325, and determines what the sequence of the pseudorandom bit stream 362 is. The seed 366 indicates where the sequence starts. The first XOR gate 335 receives the pseudorandom bit stream 362 via a second input and convolves the bit streams 350 and 362 by selectively inverting the bits in the bit stream 350 based on the pseudorandom bit stream 362, and the first XOR gate 335 outputs a bit stream 368. The second XOR gate 345 convolves the bit stream 370 it receives from the TDR unit 340 on a first input with a delayed pseudorandom bit stream 372 it receives on a second input from the delay unit 330, by selectively inverting the bits in the TDR output bit stream 370 based on the delayed pseudorandom bit stream 372, and the second XOR gate 345 outputs an bit stream 355 to the secure server or secure controller 310. The bit stream 355 includes the same unencrypted data bits and encrypted data bits as the bit stream 350. In one embodiment, the PRPG 325 may provide PRPG state data 374 to the delay unit 330 for application to coefficients of a mathematical computation based on the PRPG 325.

Figure 3B:
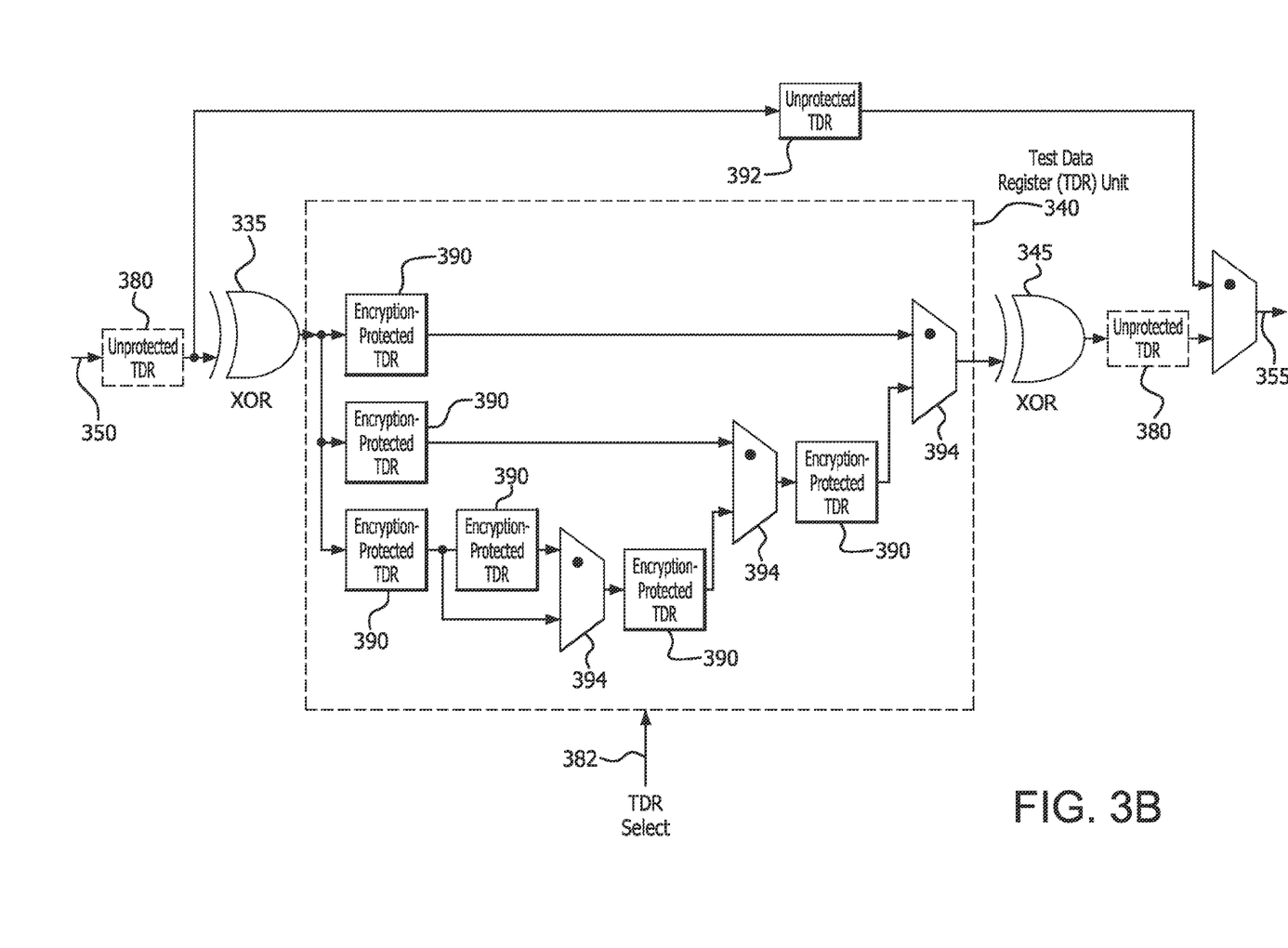
FIG. 3B shows an example of a configuration of test data registers (TDRs) in a TDR unit in the IC of FIG. 3A.

The IC 305 may further include one or more unprotected TDRs 380, as shown in FIG. 3A. If the length of the TDR unit 340 is changed, such as by applying a TDR select signal 382 to the TDR unit 340 to change the configuration of TDRs in the TDR unit 340, as shown in FIG. 3B, the delay unit 330 may be adjusted as well via a TDR length/delay adjustment signal 384 so that the bit streams 370 and 372 are in sync. For example, a bit of the bit stream (hereinafter referred to as a TDI bit), that was convolved with a particular bit of the pseudorandom bit stream 362, also needs to be convolved with the same particular bit in the delayed pseudorandom bit stream 372 after the TDI bit exits from the TDR unit 340 via the bit stream 370. Alternatively, the delay unit 330 may be a phase shifter or a mathematical function that determines the timing of the bit stream 372.

In accordance with one embodiment, bits in the bit stream 350 that are destined to be updated in at least one TDR in TDR unit 340 are encrypted, and all other bits in the bit stream 350 are unencrypted. Further, bits in the bit stream 355 that are captured by at least one TDR in TDR unit 340 are unencrypted.

FIG. 3B shows an example of a configuration of TDRs in the TDR unit 340 of the IC 305 of FIG. 3A. As shown in FIG. 3B, the TDR unit 340 may include a plurality of encryption-protected TDRs 390, at least one unprotected TDR 392, and a plurality of scan-path switches 394 to facilitate the selection of at least one TDR, or a configuration of concatenated TDRs, as determined by TDR select signal 382. The scan-path switches 394 may be multiplexers.

The PRPG state data 374 may be generated by the PRPG 325 based on encryption logic that is dependent on the length of the TDR scan chain, the position of the at least one TDR in the chain, and the total number of scan shifts that will take place (i.e., length of the bit stream).

Figure 4A:
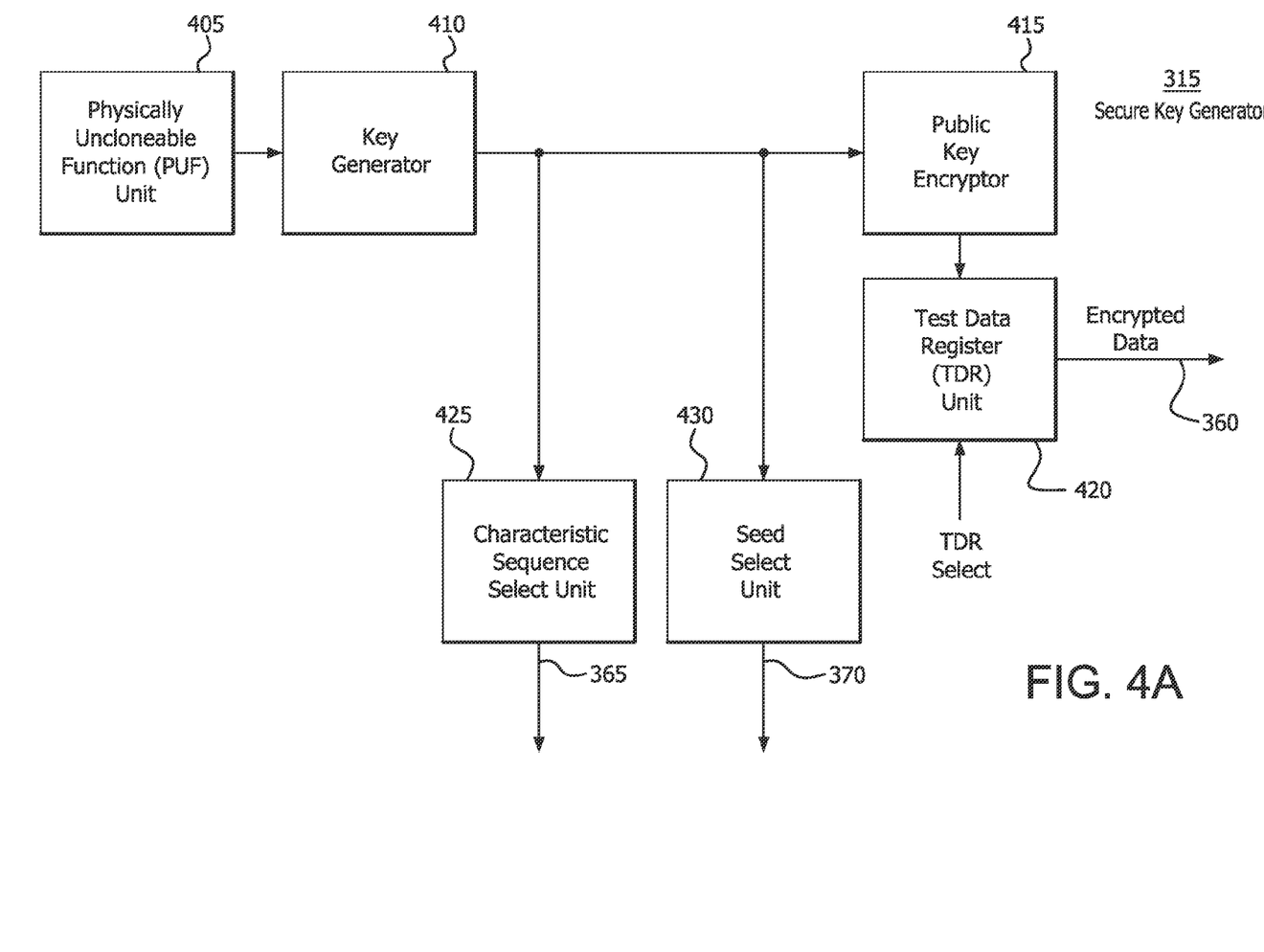
FIG. 4A is a block diagram of an example block diagram of a secure key generator used in the IC of FIG. 3A.

FIG. 4A is a block diagram of an example block diagram of the secure key generator 315 used in the IC 305 of FIG. 3A. The secure key generator 315 may include a physically uncloneable function (PUF) unit 405, a key generator 410, a public key encryptor 415, a TDR 420, a polynomial select unit 425 and a seed select unit 430. When the IC 305 is powered up, the PUF unit 405 inputs a truly random number to the key generator 420 unit, a polynomial select unit 425 generates a polynomial 365, and a seed select unit 430 generates a seed 370. The key generator 410 sends data to the public key encryptor 415 to be encrypted and fed through at least one selected TDR 420 to generate encrypted data 360, which is sent to the secure server or secure controller 310.

Figure 4B:
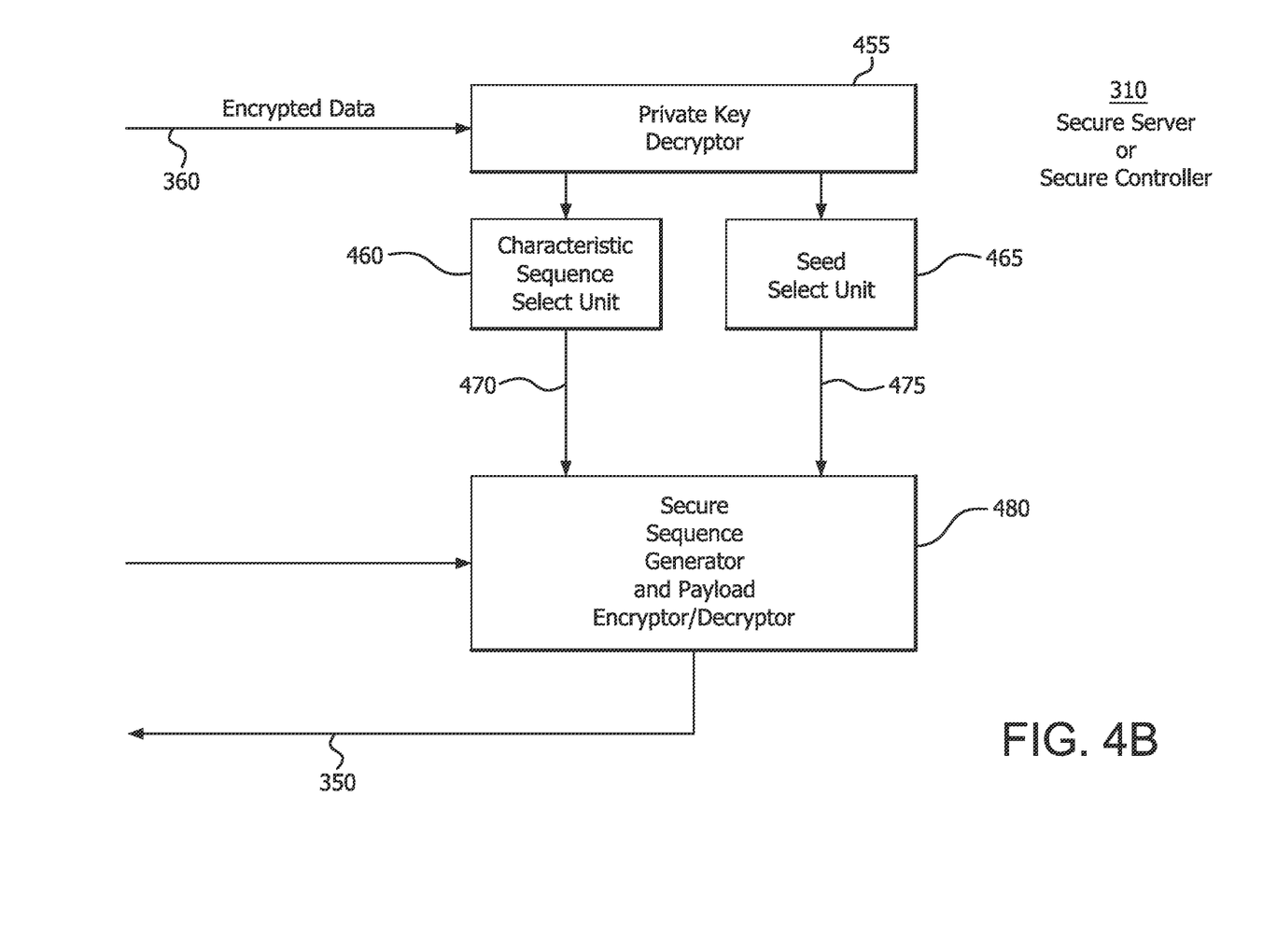
FIG. 4B is a block diagram of an example block diagram of the secure server or secure controller of FIG. 3A.

FIG. 4B is a block diagram of an example block diagram of the secure server or secure controller 310 of FIG. 3A. Referring to FIG. 4B, the secure server or secure controller 310 may include a private key decryptor 455 which decrypts the encrypted data 360, and a characteristic sequence select unit 460 and a seed select unit 465. The characteristic sequence select unit 460 generates a characteristic sequence 470, (e.g., a polynomial), and the seed select unit 465 generates a seed 475. The secure server or secure controller 310 may further include a secure sequence generator and payload encryptor/decryptor 480, which generates the encrypted TDI bit stream 350 based on the characteristic sequence 470, the seed 475 and the encrypted TDO bit stream 355.

The secure server or secure controller 310 may be configured to assemble TDR scan data so that the correct bits in the bit stream are encrypted and decrypted to reflect the changing configuration of the TDR network. Software running in the secure server or secure controller 310 may produce a bit stream with appropriately encrypted portions, and identify and decrypt the appropriate portions of the bit stream. This bit stream may be produced for any particular configuration of the TDR network, and any number of devices. This capability may be used to control IEEE 1149.1, IEEE 1500 and IEEE P1687 type TDR networks that interface with various devices and systems.

Figure 5:
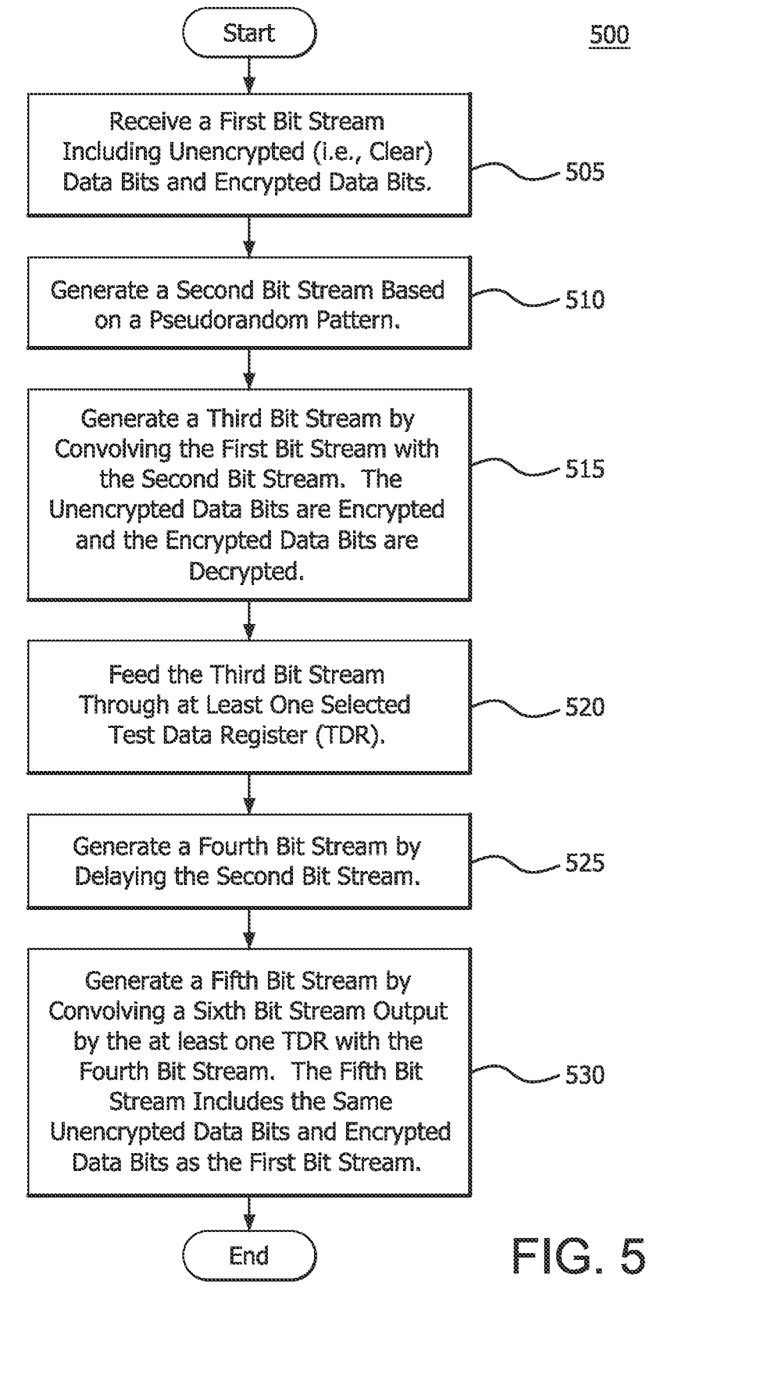
FIG. 5 is a flow diagram of an example procedure implemented by the IC of FIG. 3A.

FIG. 5 is a flow diagram of an example procedure 500 implemented by the IC 305 of FIG. 3A. Referring to FIGS. 3A and 5, the IC 305 receives a first bit stream (350) including unencrypted (i.e., clear) data bits and encrypted data bits (505) and generates a second bit stream (362) based on a pseudorandom pattern (510). A third bit stream (368) is generated by convolving the first bit stream (350) with the second bit stream (362), whereby the unencrypted data bits are encrypted and the encrypted data bits are decrypted (515). The third bit stream (368) is fed through at least one selected TDR (520). A fourth bit stream (372) is generated by delaying the second bit stream (362, 525). A fifth bit stream (355) is generated by convolving a sixth bit stream (370) output by the at least one selected TDR with the fourth bit stream (372, 530). The fifth bit stream (355) includes the same unencrypted data bits and encrypted data bits as the first bit stream (350).

Although features and elements of the embodiments are described above in particular combinations, each feature or element can be used alone without the other features and elements or in various combinations with or without other features and elements. The methods provided herein may be implemented in a computer program, software, or firmware incorporated in a computer-readable storage medium for execution by a general purpose computer or a processor.

Suitable processors, in association with a universal serial bus (USB), a controller and the like, may include, by way of example, a general purpose processor, a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture and test semiconductor devices (e.g., processors) that embody various aspects of the present invention.

What is claimed is:

1. A method of securely testing an integrated circuit (IC), the method comprising:
   receiving a first bit stream including unencrypted data bits and encrypted data bits;
   generating a second bit stream based on a pseudorandom pattern;
   generating a third bit stream by convolving the first bit stream with the second bit stream;
   feeding the third bit stream to at least one selected test data register (TDR) in the IC;
   generating a fourth bit stream by delaying the second bit stream; and
   generating a fifth bit stream by convolving a sixth bit stream output by the at least one selected TDR with the fourth bit stream, wherein the fifth bit stream includes the same unencrypted data bits and encrypted data bits as the first bit stream.

2. The method of claim 1 wherein a first exclusive-or (XOR) gate in the IC is used to convolve the first bit stream with the second bit stream.

3. The method of claim 2 wherein a second XOR gate in the IC is used to convolve the sixth bit stream output by the at least one selected TDR with the fourth bit stream.

4. The method of claim 3 wherein the first XOR gate is configured to selectively invert the bits in the first bit stream based on the second bit stream.

5. The method of claim 4 wherein the second XOR gate is configured to selectively invert the bits in the sixth bit stream output by the at least one selected TDR based on the fourth bit stream.

6. The method of claim 1 wherein the at least one selected TDR is selected from a plurality of concatenated TDRs.

7. The method of claim 1 wherein bits in the first bit stream that are destined to be updated in the at least one selected TDR are encrypted, and all other bits in the first bit stream are unencrypted.

8. The method of claim 1 wherein bits in the first bit stream that are captured by the at least one selected TDR are unencrypted.

9. A semiconductor device comprising:
   an input configured to receive a first bit stream including unencrypted data bits and encrypted data bits;
   a pseudorandom pattern generator (PRPG) configured to generate a second bit stream;
   a first exclusive-or (XOR) gate configured to generate a third bit stream by convolving the first bit stream with the second bit stream;
   a test data register (TDR) unit configured to receive the third bit stream;
   a delay unit configured to generate a fourth data stream by delaying the second bit stream; and
   a second XOR gate configured to generate a fifth bit stream by convolving a sixth bit stream output by the at least one selected TDR with the fourth bit stream, wherein the fifth bit stream includes the same unencrypted data bits and encrypted data bits as the first bit stream.

10. The semiconductor device of claim 9 wherein the first XOR gate is coupled to the PRPG, the delay unit and an input to the TDR unit.

11. The semiconductor device of claim 9 wherein the second XOR gate is coupled to the delay unit and an output from the TDR unit.

12. The semiconductor device of claim 9 wherein the second bit stream is generated by the PRPG based on a selected characteristic sequence and a selected seed.

13. The semiconductor device of claim 9 wherein a length of the TDR unit is adjustable.

14. The semiconductor device of claim 9 wherein the first bit stream consists of logic 1 bits and logic 0 bits.

15. The semiconductor device of claim 9 wherein the first XOR gate is configured to selectively invert the bits in the first bit stream based on the second bit stream.

16. The semiconductor device of claim 15 wherein the second XOR gate is configured to selectively invert the bits in the sixth bit stream based on the second bit stream.

17. The semiconductor device of claim 15 wherein bits in the first bit stream that are destined to be updated in the at least one selected TDR are encrypted, and all other bits in the first bit stream are unencrypted.

18. The semiconductor device of claim 15 wherein bits in the first bit stream that are captured by the at least one selected TDR are unencrypted.

19. A non-transitory computer-readable storage medium configured to store a set of instructions used for manufacturing a semiconductor device, wherein the semiconductor device comprises:
   an input configured to receive a first bit stream including unencrypted data bits and encrypted data bits;
   a pseudorandom pattern generator (PRPG) configured to generate a second bit stream;
   a first exclusive-or (XOR) gate configured to generate a third bit stream by convolving the first bit stream with the second bit stream;
   a test data register (TDR) unit configured to receive the third bit stream;
   a delay unit configured to generate a fourth data stream by delaying the second bit stream; and
   a second XOR gate configured to generate a fifth bit stream by convolving a sixth bit stream output by the at least one selected TDR with the fourth bit stream, wherein the fifth bit stream includes the same unencrypted data bits and encrypted data bits as the first bit stream.

20. The non-transitory computer-readable storage medium of claim 19 wherein the instructions are Verilog data instructions or hardware description language (HDL) instructions.

* * * * *